United States Patent
Yuan et al.

(10) Patent No.: US 10,146,053 B2
(45) Date of Patent: Dec. 4, 2018

(54) MULTIPLEXED HOLOGRAM TILING IN A WAVEGUIDE DISPLAY

(71) Applicant: MICROSOFT TECHNOLOGY LICENSING, LLC, Redmond, WA (US)

(72) Inventors: Sheng Yuan, Santa Clara, CA (US); Ian Nguyen, Renton, WA (US); Steve Robbins, Bellevue, WA (US); David D. Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 894 days.

(21) Appl. No.: 13/720,438

(22) Filed: Dec. 19, 2012

(65) Prior Publication Data
US 2014/0168735 A1 Jun. 19, 2014

(51) Int. Cl.
*G03H 1/20* (2006.01)
*G02B 27/01* (2006.01)
(Continued)

(52) U.S. Cl.
CPC ......... *G02B 27/0103* (2013.01); *G02B 27/01* (2013.01); *G03H 1/202* (2013.01);
(Continued)

(58) Field of Classification Search
CPC .... G02B 2027/0105; G02B 2027/0123; G02B 2027/0174; G02B 27/0103; G02B 5/32; G02B 27/2228; G02B 27/01; G02B 27/22; G02B 5/30; G02B 27/10; G02B 6/26; G02B 6/34; H04N 9/3197; H04N 9/3105; H04N 9/3108; H04N 13/0404; H04N 13/0497;
(Continued)

(56) References Cited

U.S. PATENT DOCUMENTS 4,711,512 A 12/1987 Upatnieks
5,339,177 A 8/1994 Jenkins et al.
(Continued)

FOREIGN PATENT DOCUMENTS

CN 1892271 A 1/2007
CN 101655606 A 2/2010
(Continued)

OTHER PUBLICATIONS

Pu et al (High Density recording in photopolymer based holographic three-dimensional disks. Applied Optics, vol. 35, No. 14, May 10, 1996, pp. 2389-2398).*
(Continued)

*Primary Examiner* — Stephone B Allen
*Assistant Examiner* — Jyotsna Dabbi
(74) *Attorney, Agent, or Firm* — Alleman Hall Creasman & Tuttle LLP (57) ABSTRACT

Near-eye display devices having angularly multiplexed holograms are disclosed. One example includes an image source, a waveguide, and a controller. The waveguide is configured to propagate light received the image source to a user of the near-eye display device, and includes a holographic grating including a plurality of angularly multiplexed holograms. The controller is configured to control display of an image via the image source.

13 Claims, 9 Drawing Sheets

(51) Int. Cl.
- *G03H 1/26* (2006.01)
- *G03H 1/28* (2006.01)
- *G02B 5/18* (2006.01)
- *G03H 1/22* (2006.01)
- *G03H 1/02* (2006.01)

(52) U.S. Cl.
CPC ............. *G03H 1/265* (2013.01); *G03H 1/28* (2013.01); *G02B 5/1857* (2013.01); *G02B 2027/0174* (2013.01); *G03H 1/0248* (2013.01); *G03H 2001/2207* (2013.01); *G03H 2001/2239* (2013.01); *G03H 2001/2242* (2013.01)

(58) Field of Classification Search
CPC ............. G02F 1/1393; G02F 1/13306; G02F 1/133615; G02F 2001/133607; G02F 2001/133616; G02F 1/1347; G02F 1/1334; G02F 1/1341; G02F 2201/305; G02F 1/292; G02F 1/13471; G02F 1/035; G02F 1/2955; G02F 1/3132; G02F 1/3136; G02F 2201/307; G02F 1/13; G03B 21/132

See application file for complete search history.

(56) References Cited

U.S. PATENT DOCUMENTS

| | | | |
|---|---|---|---|
| 5,856,842 | A | 1/1999 | Tedesco |
| 6,323,970 | B1 | 11/2001 | Popovich |
| 6,580,529 | B1 | 6/2003 | Amitai et al. |
| 7,092,133 | B2 | 8/2006 | Anderson et al. |
| 7,119,965 | B1 | 10/2006 | Rolland et al. |
| 7,184,615 | B2 | 2/2007 | Levola |
| 7,480,084 | B2 | 1/2009 | Ingwall et al. |
| 7,576,916 | B2 | 8/2009 | Amitai |
| 8,160,411 | B2 | 4/2012 | Levola et al. |
| 8,233,204 | B1 | 7/2012 | Robbins et al. |
| 8,611,014 | B2 | 12/2013 | Valera et al. |
| 8,817,350 | B1 | 8/2014 | Robbins et al. |
| 2004/0141217 | A1 | 7/2004 | Endo et al. |
| 2006/0291021 | A1 | 12/2006 | Mukawa |
| 2007/0041684 | A1 | 2/2007 | Popovich et al. |
| 2007/0109618 | A1* | 5/2007 | Tsukagoshi .......... G03H 1/0256 359/11 |
| 2010/0039796 | A1* | 2/2010 | Mukawa ............... G02B 6/0033 362/97.1 |
| 2010/0157400 | A1 | 6/2010 | Dimov et al. |
| 2011/0194163 | A1 | 8/2011 | Shimizu et al. |
| 2014/0104665 | A1 | 4/2014 | Popovich et al. |
| 2014/0140653 | A1 | 5/2014 | Brown et al. |
| 2014/0140654 | A1 | 5/2014 | Brown et al. |
| 2014/0204455 | A1 | 7/2014 | Popovich et al. |

FOREIGN PATENT DOCUMENTS

| | | |
|---|---|---|
| EP | 0389123 A2 | 9/1990 |
| EP | 0724174 A1 | 7/1996 |
| EP | 1748305 A1 | 1/2007 |
| JP | S59146083 A | 8/1984 |
| JP | H11515110 A | 12/1999 |
| JP | 2002287078 A | 10/2002 |
| JP | 2004226619 A | 8/2004 |
| JP | 2005084522 A | 3/2005 |
| JP | 2011002962 A | 1/2011 |
| JP | 2011248318 A | 12/2011 |
| WO | 9701133 A1 | 1/1997 |
| WO | 2010002497 A1 | 1/2010 |
| WO | 2012172295 A1 | 12/2012 |

OTHER PUBLICATIONS

Minier, V. et al., "Diffraction Characteristics of Superimposed Holographic Gratings in Planar Optical Waveguides," IEEE Photonics Technology Letters, vol. 4, No. 10, Oct. 1992, 4 pages.

Pu, A. et al., "Exposure Schedule for Multiplexing Holograms in Photopolymer Films," Optical Engineering, vol. 35, No. 10, Oct. 1996, 6 pages.

Han, X. et al., "Accurate Diffraction Efficiency Control for Multiplexed Volume Holographic Gratings," Optical Engineering, vol. 41, No. 11, Available Online Oct. 2002, 13 pages.

Yan, A. et al., "Multiplexing Holograms in the Photopolymer with Equal Diffraction Efficiency," Advances in Optical Data Storage Technology, SPIE vol. 5643, Nov. 2004, 9 pages.

Massenot, S. et al., "Multiplexed Holographic Transmission Gratings Recorded in Holographic Polymer-Dispersed Liquid Crystals: Static and Dynamic Studies," Applied Optics, vol. 44, No. 25, Sep. 2005, 8 pages.

Zharkova, G. et al., "Study of the Dynamics of Transmission Gratings Growth on Holographic Polymer-Dispersed Liquid Crystals," International Conference on Methods of Aerophysical Research, ICMAR 2008, Jun. 2008, 4 pages.

Kress, B. et al., "Exit Pupil Expander for Wearable See-Through Displays," Photonic Applications for Aerospace, Transportation, and Harsh Environment IIII, SPIE vol. 8368, Apr. 2012, 8 pages.

ISA European Patent Office, International Search Report and Written Opinion of PCT/US2013/076133, Netherlands, WIPO, dated Mar. 18, 2014, 12 pages.

Hua, Hong, "Sunglass-Like Displays Become a Reality with Free-Form Optical Technology", Retrieved at <<http://spie.org/x88964.xml>>, Aug. 20, 2012, pp. 4.

"Advanced Research & Development", <<http://www.luminitco.com/Advanced_Research_Development>>, Retrieved Date: Oct. 15, 2012, pp. 3.

The State Intellectual Property Office of China, First Office Action and Search Report Issued in Chinese Patent Application No. 201380067286.9, dated Dec. 2, 2016, China, 13 pages. (Submitted with partial English translation of Notice on the First Office Action and Search Report and English Summary of First Office Action).

"Office Action Issued in Japanese Patent Application No. 2015-549628", dated Sep. 12, 2017, 7 Pages.

"Office Action Issued in Chinese Patent Application No. 201380067286.9", dated Nov. 28, 2017, 6 Pages.

"Notice of Allowance Issued in Japanese Patent Application No. 2015-549628", dated May 8, 2018, 3 Pages.

* cited by examiner

MULTIPLEXED HOLOGRAM TILING IN A WAVEGUIDE DISPLAY

BACKGROUND

A head-mounted display may utilize a waveguide to deliver an image to an eye of a user. However, a field of view that can be supported by a waveguide display device may be quite small. The field of view may be increased by employing layered switchable Bragg gratings (SBGs) to create spatially separated diffraction elements that have a combined field of view that is greater than a field of view of a single diffraction element. However, such spatial separation may greatly increase a thickness of the waveguide, and also may negatively affect output performance of the display.

SUMMARY

Embodiments are disclosed that relate to providing a near-eye display device. For example, one disclosed embodiment provides a near-eye display device comprising an image source, a waveguide comprising a plurality of angularly multiplexed holographic gratings, the waveguide being configured to propagate light from the image source to a field of view of a user of the near-eye display device, and a controller configured to control display of an image via the image source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, waveguide display devices, such as near-eye display devices, may suffer from a small field of view. While various approaches to increasing the field of view may be employed, such approaches may have shortcomings. For example, some approaches to increase a field of view of a waveguide display device may increase the size of the display device and/or create luminance non-uniformity in an output of the display device.

As one specific example of an approach for increasing a field of view of a waveguide display, Bragg gratings may be used to potentially increase the field of view by time-sequentially tiling, in angular space, different images from a microdisplay (e.g. a liquid crystal on silicon (LCOS)).

However, one shortcoming of Bragg gratings is that the angular bandwidth of an individual grating may be as small as a few degrees. To overcome this issue, a number of layers of gratings may be increased. However, the use of a greater number of layers may increase the thickness of a waveguide display. For example, if an angular bandwidth of a Bragg grating is 10 degrees, a display with a field of view of 60×40 may include 72 layers to provide an RGB output.

Thus, embodiments are disclosed herein that relate to providing a near-eye display device with a wide field of view through the use of angularly multiplexed holographic recordings to form gratings for the waveguide. The angularly multiplexed holographic recordings may be spatially overlapped in relation to one another. This may help to decrease a size of the display device compared to the use of layers of gratings.

Figure 1:
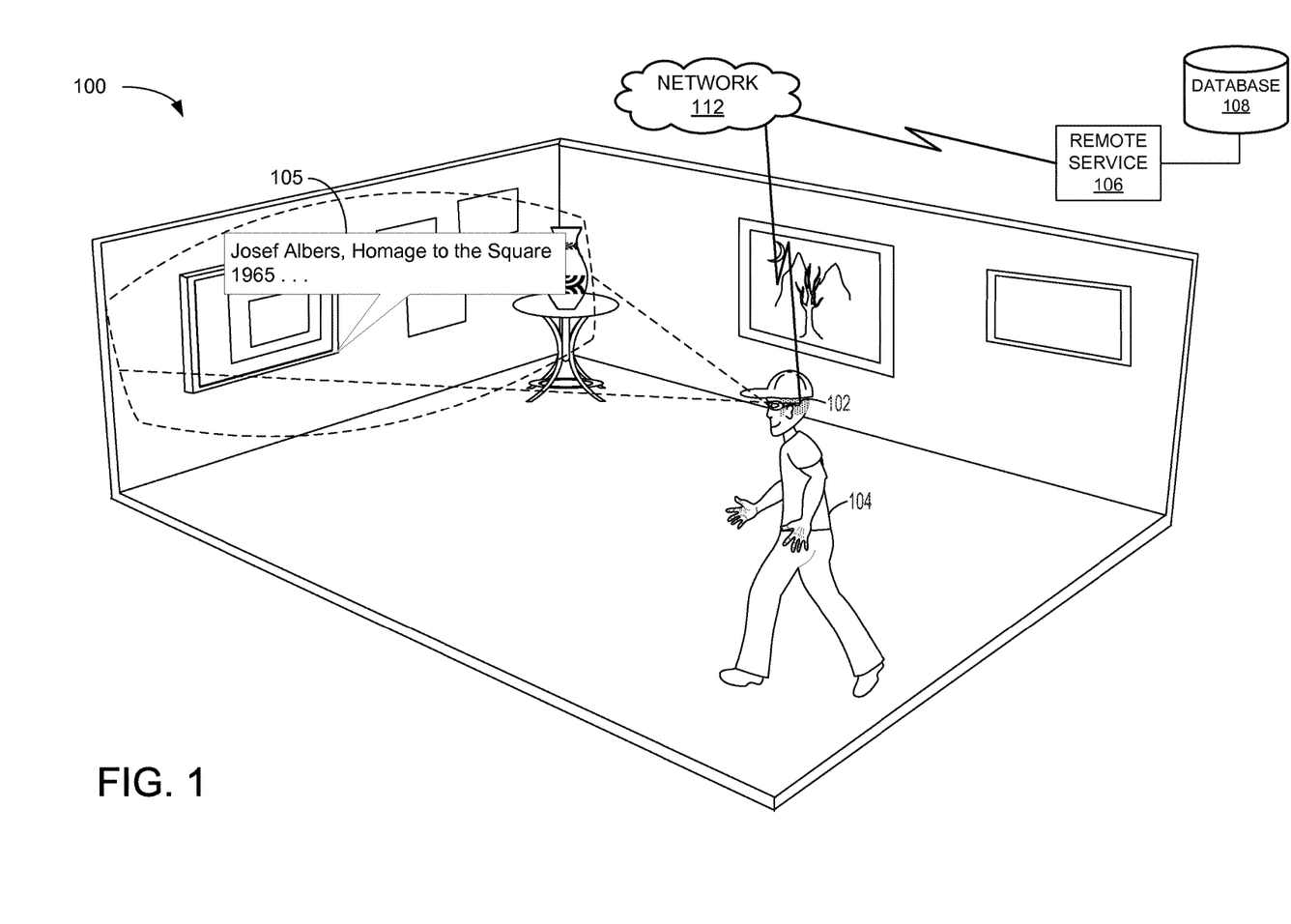
FIG. 1 schematically shows an embodiment of a near-eye display device in an example use environment.

FIG. 1 shows an example embodiment of an example use environment 100 for a near-eye display device 102, and shows a user 104 wearing the near-eye display device 102 to view an augmented reality image of the use environment. As a non-limiting example, the near-eye display device may be a head-mounted, see-through display device.

The user 104 may view the environment 100 through the near-eye display device 102. The depicted near-eye display device 102 takes the form of a head mounted device (HMD) that allows both hands of the user 104 to be free to interact with other objects. The near-eye display device 102 includes a see-through display system configured to allow the visual augmentation of an appearance of the environment 100 to the user 104. In other words, the see-through display allows light from the environment 100 to pass through the see-through display so that the user 104 can directly see the actual environment 100 in addition to one or more virtual objects displayed as an overlay to the actual environment 100.

Figure 2:
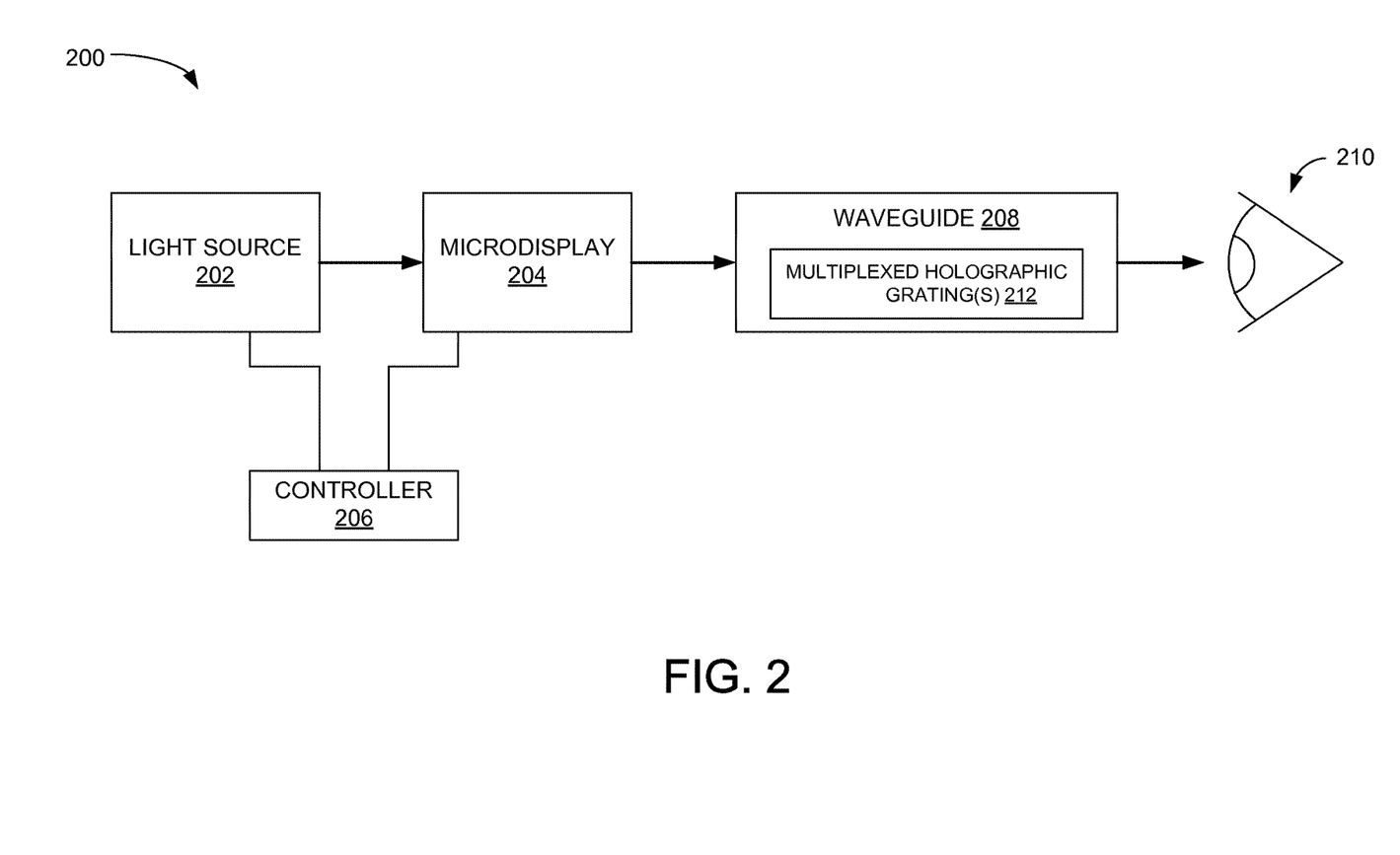
FIG. 2 shows a block diagram of a display device, in accordance with one embodiment of the present disclosure.

In the depicted example, the near-eye display device 102 is displaying augmenting imagery in the form of one or more virtual objects 105 in the form of information pertaining to one or more objects in the environment 100. The displayed information may be obtained in any suitable manner. For example, the displayed information may be stored locally on the near-eye display device 102, may be retrieved from a remote service 106 and database 108 via a network 112, and/or may be received in any other suitable manner FIG. 2 shows a block diagram of a display subsystem 200 suitable for use with near-eye display device 102 of FIG. 1. The display subsystem 200 includes a light source 202 configured to provide light to a microdisplay 204 to produce an image. The light source 202 may utilize any suitable light source or sources, including but not limited to one or more laser diode light sources. As a more specific example, the light source 202 may utilize one or more of each of red, green, and blue laser diodes.

The light source 202 may project light onto one or more microdisplays 204. In the example of a color head-mounted display device, a single microdisplay may be used to generate images in a color field-sequential manner, while in other embodiments, separate microdisplays may be used for each color to allow the simultaneous display of colors. In some embodiments, a separate microdisplay (or arrangement of plural microdisplays) may be used for each eye. Any suitable type of microdisplay may be used, including but not limited to one or more liquid crystal on silicon (LCOS) microdisplays. In yet other embodiments, one or more emissive microdisplays may be used (e.g. an organic light-emitting device microdisplay), such that light source 202 may be omitted.

A controller 206 may send control signals to the light source 202 and the microdisplay 204 to control the display of an image via the microdisplay 204. Light from the microdisplay may then be coupled into a waveguide 208. The waveguide 208 may include one or more diffractive elements to couple light into and out of the waveguide and/or to fan light out to a desired field of view. As mentioned above, the use of Bragg gratings as diffractive elements may help to achieve a desired field of view. However, layering the gratings or otherwise spatially separating the gratings may give rise to issues with display system size and optical artifacts.

As such, the waveguide 208 includes one or more multiplexed holographic grating elements 212, as opposed to spatially separated gratings. As described in more detail below, the multiplexed holographic grating elements comprise a plurality of angularly multiplexed holograms having equal diffractive power. The use of such an arrangement of holograms may allow an angular bandwidth of a grating to be increased without increasing a thickness of a display device. In some embodiments, a plurality of multiplexed holographic grating elements may be used with a waveguide, including but not limited to a multiplexed holographic input grating, a multiplexed holographic output grating, and/or a holographic multiplexed fold grating.

As mentioned above, in an angularly multiplexed hologram, two or more holographic recordings may overlap on the same spatial location of the waveguide. For example, a first hologram of the two or more holographic recordings may be angularly separated from a second hologram of the two or more holographic recordings, such that at least a portion of an angular bandwidth of the first hologram does not overlap spatially with an angular bandwidth of the second hologram. More generally, each of the two or more holographic recordings may include a different, shifted, angular diffraction peak. Such angular separation between holographic recordings may help to increase an angular bandwidth of the combined holographic recordings such that an output of the waveguide directed toward the eye 210 has an increased angular bandwidth in comparison to a waveguide utilizing an output light coupling with a single holographic recording.

Figure 3:
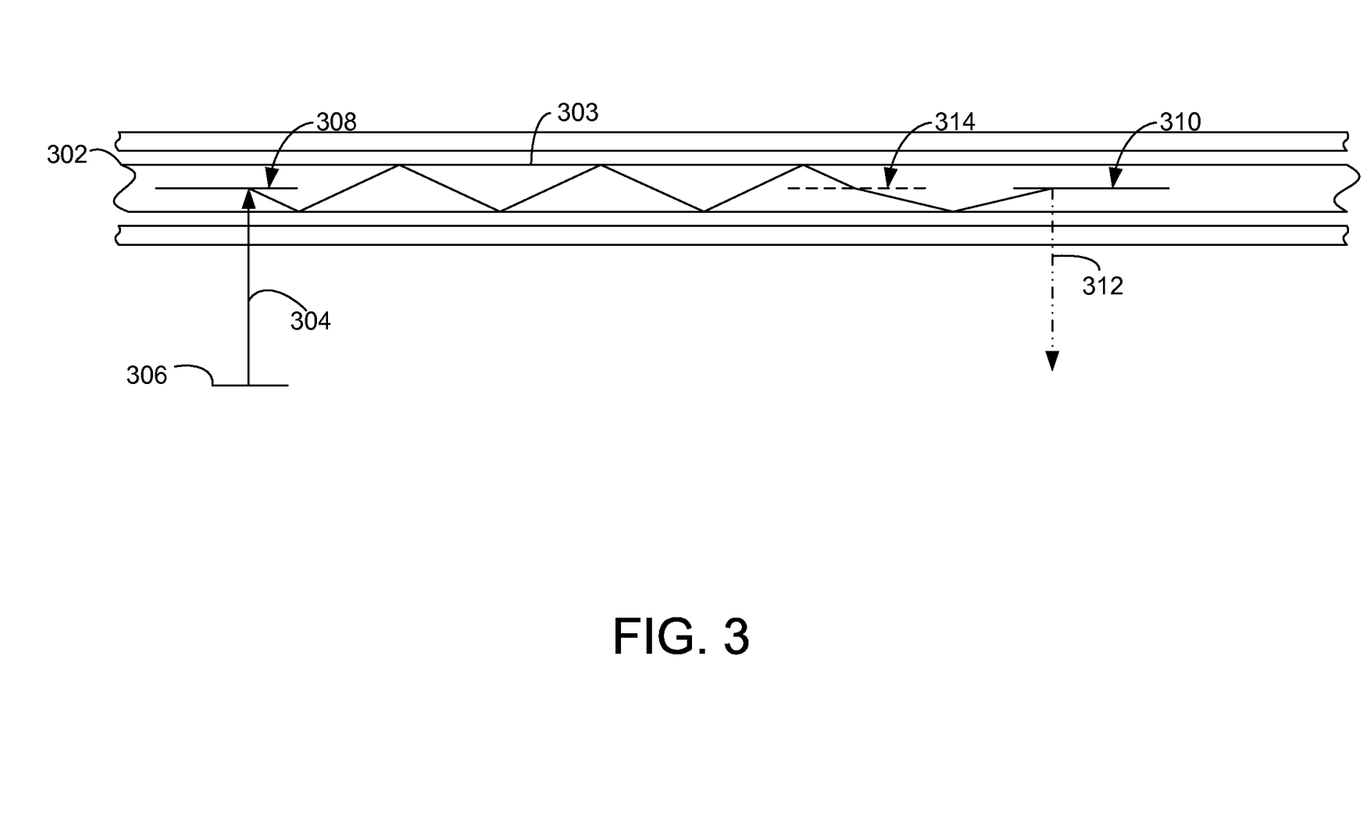
FIG. 3 schematically shows an example embodiment of a waveguide and illustrates light propagating from an input light coupling to an output light coupling of the waveguide.

FIG. 3 is a schematic representation of a waveguide 302 in accordance with an embodiment of the present disclosure. Waveguide 302 may be composed of glass, such that light is reflected by total internal reflection at an air-glass interface 303. As illustrated, waveguide 302 may receive input light 304 from an image source 306 (e.g. a microdisplay) at a multiplexed holographic light input grating 308. The multiplexed holographic light input grating 308 may include two or more angularly multiplexed holographic recordings arranged to achieve a sufficient angular bandwidth to couple all desired angles of light from light source 306 into waveguide 302. Further, the output of the waveguide may include a multiplexed holographic light output grating 310. Similarly to the multiplexed holographic light input grating 308, the multiplexed holographic light output grating 310 may include two or more angularly multiplexed holographic recordings arranged to achieve a sufficient angular bandwidth to provide a desired field of view for a display device utilizing the waveguide 302.

In some embodiments, the waveguide 302 may include one or more additional multiplexed holographic grating elements, such as a fold grating 314 utilized to fan light out in a different direction than that of light output grating 310. While depicted schematically as being located in a single layer of the waveguide 302, the multiplexed holographic grating elements 308, 310, and 314 may occupy multiple layers. For example, in display devices that utilize a light source including red, green and blue light sources, a waveguide may include three layers of light input and output gratings, each layer corresponding to a different wavelength of light.

Figure 4A:
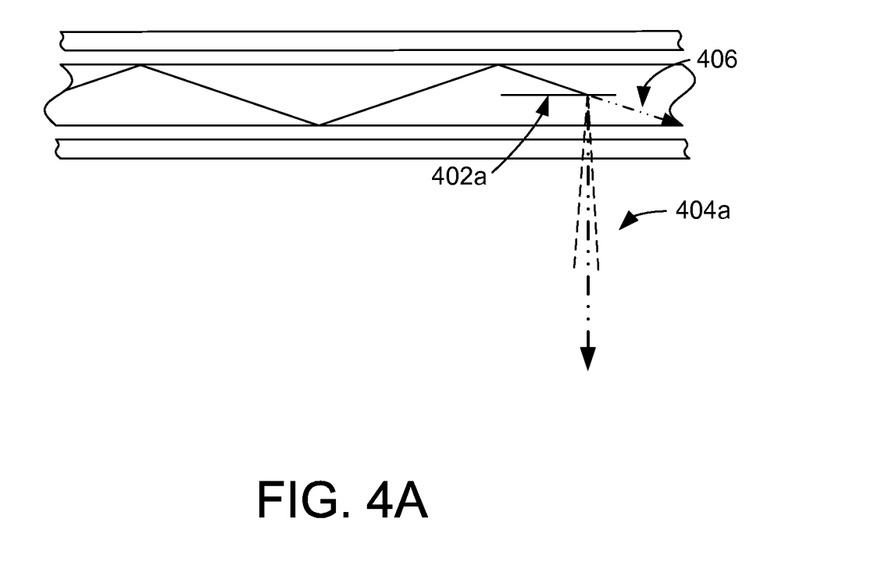
FIG. 4A schematically illustrates an output light coupling of a waveguide including a single holographic recording.
Figure 4B:
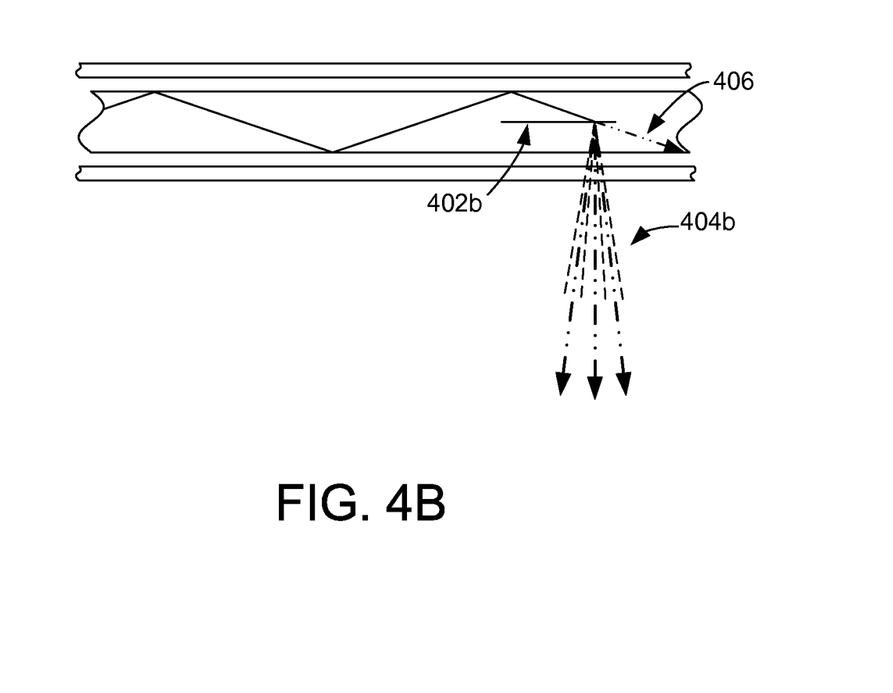
FIG. 4B schematically illustrates an output light coupling of a waveguide including a plurality of angularly multiplexed holographic recorded gratings, in accordance with an embodiment of the present disclosure.

FIGS. 4A and 4B show a schematic comparison of a field of view of a light output grating having a single Bragg grating with a light output grating having three angularly multiplexed holograms. While three angularly multiplexed holograms are illustrated, it will be understood that any suitable number may be utilized. First referring to FIG. 4A, an output grating 402a that includes a single holographic recording may provide a small overall angular bandwidth, resulting in a narrow field of view 404a. For example, a single holographic recording may provide an angular bandwidth of 10 or fewer degrees. As a result, as shown at 406, all other light outside of the very narrow angular bandwidth exits the waveguide away from the output grating 402a and therefore away from an eye of a user.

Figure 8:
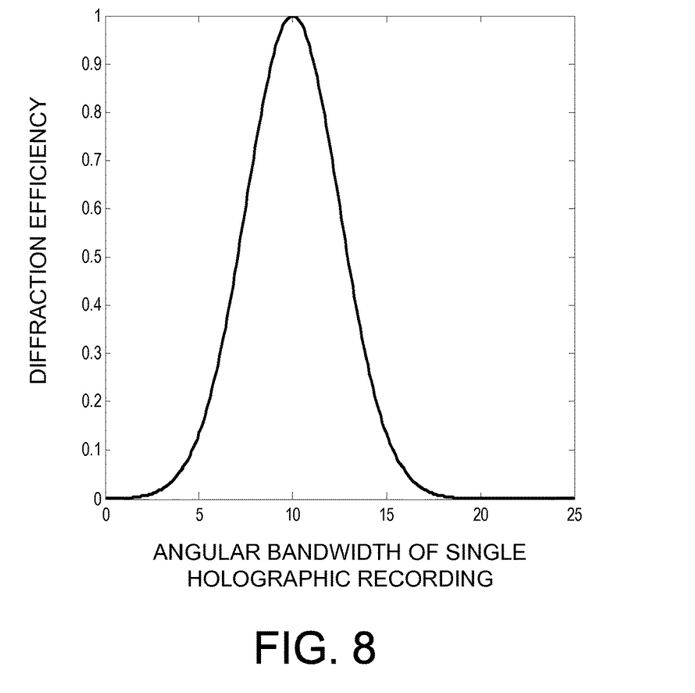
FIGS. 8-10 show graphs illustrating angular bandwidths of holographic recordings in accordance with an embodiment of the present disclosure.
Figure 9:
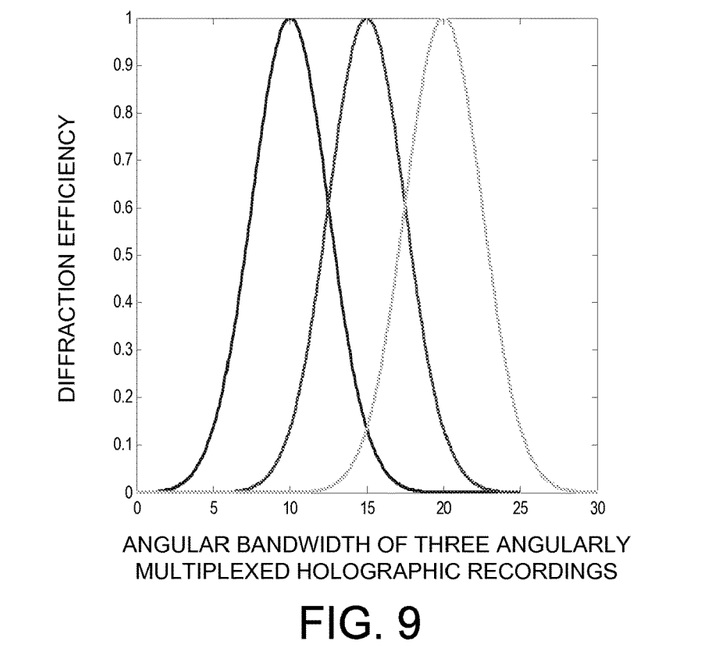
Figure 10:
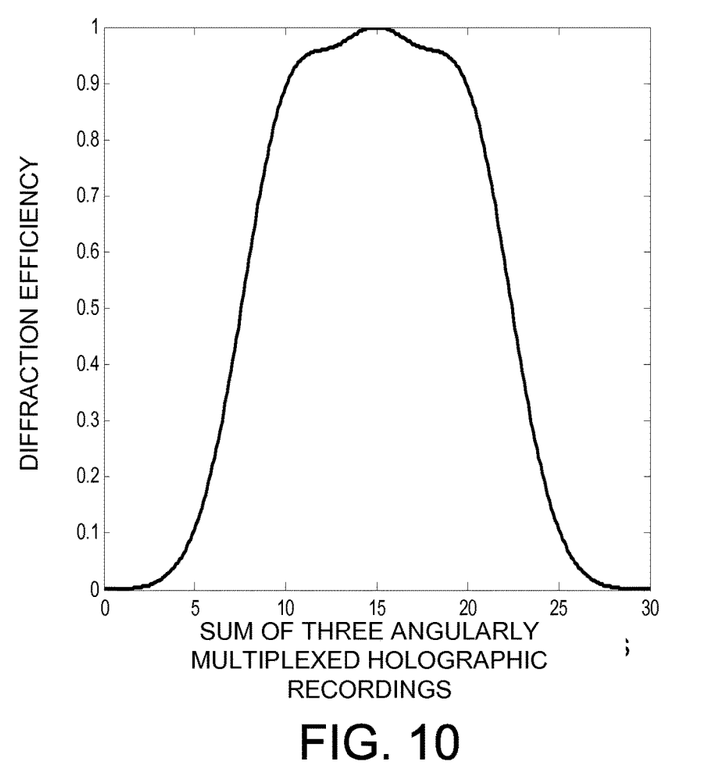

In contrast, FIG. 4B schematically shows an output grating 402b having three angularly multiplexed holographic recordings. As depicted, the angularly multiplexed holographic recordings each provide a narrow field of view similar to the field of view 404a of FIG. 4A. However, the combination of these narrow fields of view arranged at different angles provides an overall field of view 404b that is wider than the field of view 404a. FIGS. 8-10 respectively show representations of angular bandwidth for a single holographic recording, three angularly shifted holographic recordings, and the sum of the three angularly shifted holographic recordings, in terms of diffraction efficiency. As depicted, the angular bandwidth of the combined holographic recordings provides a larger overall angular bandwidth than a single holographic recording. For example, the angular bandwidth of the combined holographic recordings may provide a 20 degree horizontal field of view for a near-eye display device. In some embodiments, the combined holographic recordings may provide a near-eye display device with a field of view that is greater than 20 degrees.

The three individual fields of view of three angularly multiplexed holographic recordings that are depicted in FIG. 4B as contributing to the overall field of view 404b are representative in nature, and any suitable number of angularly multiplexed holographic recordings may be included in output grating 402b to achieve any overall desired field of view. Although FIGS. 4A and 4B are described with respect to output gratings of a waveguide, similar results may be achieved at an input grating of a waveguide, such as multiplexed holographic light input grating 308 of FIG. 3, to propagate incoming light to an output grating from a larger range of angles than a single holographic recording.

Figure 5:
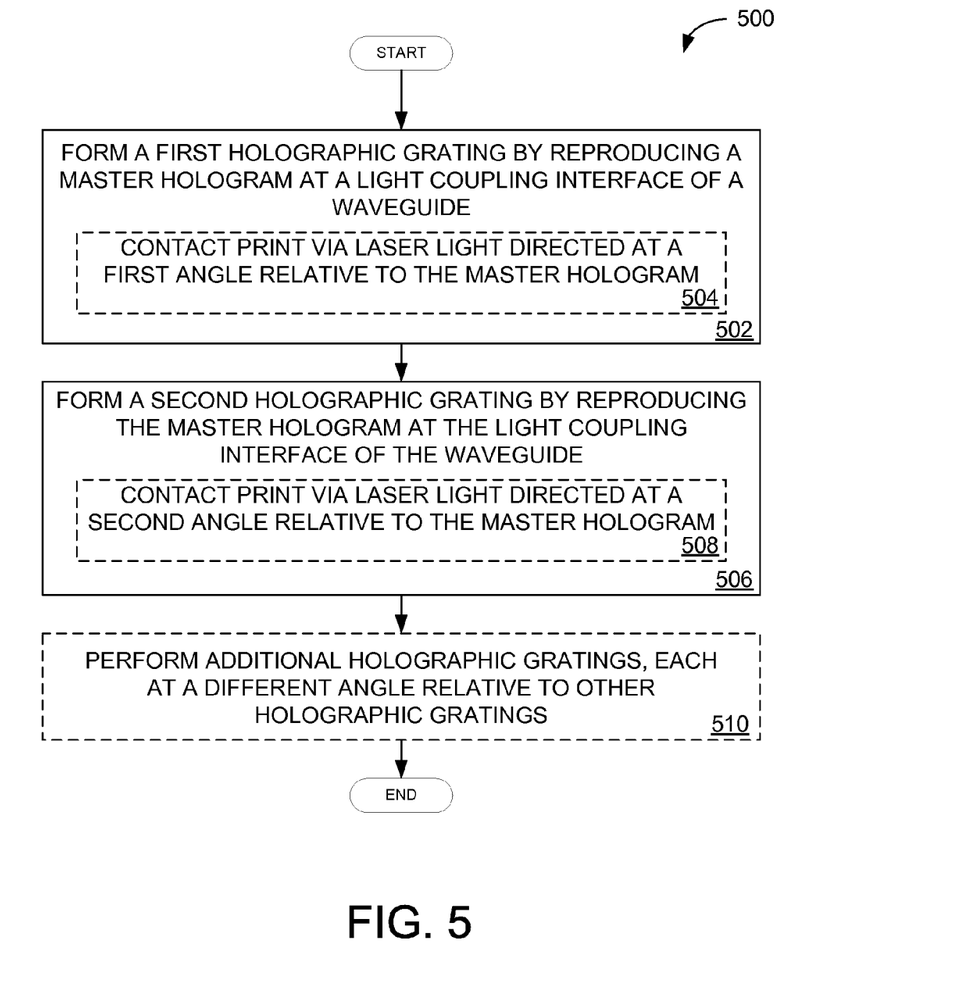
FIG. 5 is a flow chart illustrating a method of manufacturing a waveguide, in accordance with an embodiment of the present disclosure.

FIG. 5 shows a method 500 of manufacturing an angularly multiplexed holographic grating for a waveguide, such as waveguide 302 of FIG. 3, in accordance with an embodiment of the present disclosure. As indicated at 502, method 500 includes forming a first holographic recording by reproducing a master hologram at a light coupling interface of a waveguide. The first holographic recording may be formed by contact printing via laser light directed at a first angle relative to the master hologram, as indicated at 504, or in any other suitable manner.

Figure 6A:
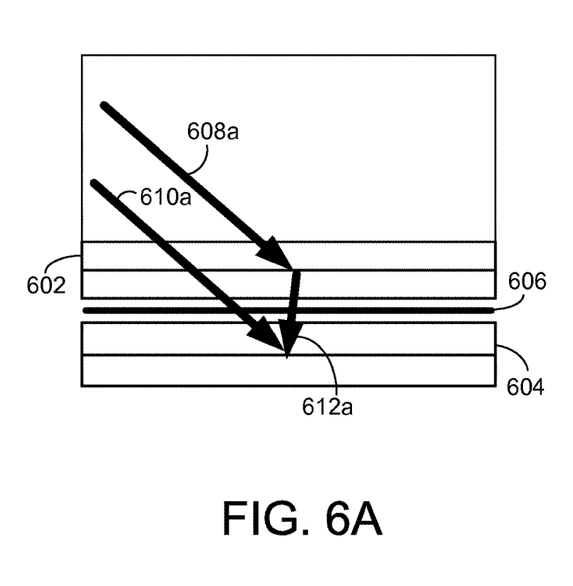
FIGS. 6A and 6B schematically show two stages of a contact copy process of the method of FIG. 5, in accordance with an embodiment of the present disclosure.
Figure 6B:
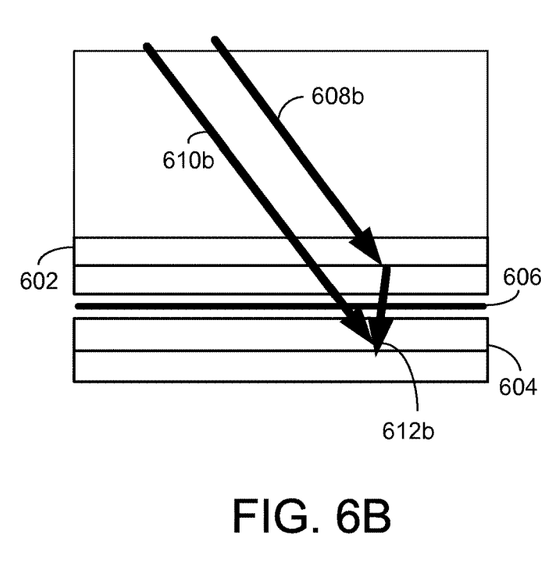

FIGS. 6A and 6B schematically illustrate examples of some of the processes described with reference to FIG. 5. As depicted in FIGS. 6A and 6B, a master hologram 602 may be placed above a copy substrate 604 to form a contact copy of the master hologram 602 in the copy substrate 604. The master hologram 602 and/or the copy substrate 604 may be formed of any suitable holographic medium, including but not limited to switchable Bragg grating material, surface-relief grating material, and/or photopolymer. In some embodiments, the master hologram 602 may be separated from the copy substrate 604 by an optical edge filter 606 in order to maximize the modulation of the recording by making the intensity of two recording beams the same. The optical edge filter 606 cuts the intensity of a zero order undiffracted beam down to equal the intensity of a diffracted beam from the master hologram 602.

As shown in FIG. 6A, laser light from a primary beam 608a and a copy beam 610a may be directed at a first incident angle relative to the master hologram. As shown in FIG. 6A, the copied hologram may be arranged at the intersection of the diffracted primary beam 612a and the copy beam 610a. In contact copying, the diffraction grating in the copy substrate 604 may have the same power as the master hologram 602 (e.g., the same grating period and orientation), but the K-vector/slant angle of the copy will be determined by the angle of incidence of the laser beam in the recording process. In some embodiments, the copy beam 610a may not be a plane beam, and may originate from a point source.

Turning back to FIG. 5, as indicated at 506, method 500 includes forming a second holographic recording by reproducing the diffractive power of the master hologram at the light coupling interface of the waveguide. The second holographic recording may be formed by contact printing via laser light directed at a second angle relative to the master hologram, as indicated at 508. This process is depicted in FIG. 6B, where primary beam 608b and copy beam 610b are at a second incident angle relative to the master hologram 602 that is different from the first angle depicted in FIG. 6A. As a result, a second hologram recording is arranged at the intersection of the primary diffracted beam 612b and the copy beam 610b.

As indicated at 510, method 500 may include performing additional holographic recordings, each being recorded at a different incident beam angle relative to those used to form other holographic recordings. In this way, two or more angularly multiplexed holographic recordings may be recorded such that the grating spacing is the same while the angular performance of each grating is tuned to a different set of angles. In some embodiments, each copy hologram may be made sequentially so that only two beams are present at the copy substrate at any time. If more than one laser beam is incident on the master hologram then there may be an interaction between a) the diffracted beam from the first beam and the un-diffracted second beam, b) the un-diffracted first and second beam, and/or c) the un-diffracted first beam and the diffracted beam of the second beam. In other words, the use of more than two incident laser beams may cause a multiplicity of interactions. However, under certain circumstances, these interactions may be intentional where the recorded geometry requires the interaction between a multiplicity of beams.

As mentioned above, the disclosed embodiments of display systems, waveguides, and angularly multiplexed holograms therefor, may be used in conjunction with a computing system of one or more computing devices. In particular, such methods and processes may be utilized in conjunction with a computer-application program or service, an application-programming interface (API), a library, and/or other computer-program product, e.g. to effect operation of the display system.

Figure 7:
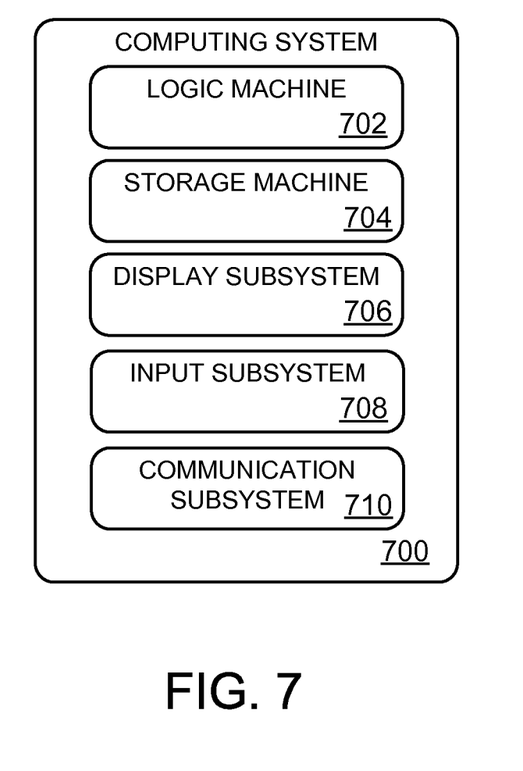
FIG. 7 is a block diagram of a computing system, in accordance with an embodiment of the present disclosure.

FIG. 7 schematically shows a non-limiting embodiment of a computing system 600 that can enact one or more of the methods and processes described above. Computing system 700 is shown in simplified form. Computing system 700 may take the form of a head-mounted see-through display device, as well as any other suitable computing system, including but not limited to gaming consoles, personal computers, server computers, tablet computers, home-entertainment computers, network computing devices, mobile computing devices, mobile communication devices (e.g., smart phone), and/or other computing devices.

Computing system 700 includes a logic machine 702 and a storage machine 704. Computing system 700 may also include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. For example, controller 206 of FIG. 2 may include and/or be in operative communication with logic machine 702 and/or storage machine 704 in order to control the light source 202 and/or the microdisplay 204. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium as a signal (e.g., an electromagnetic signal, an optical signal, etc.), as opposed to being stored on a physical device.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology, including but not limited to the near-eye display systems described herein. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, microphone, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A near-eye display device, comprising:
an image source;
a waveguide configured to propagate light from the image source to a field of view of the near-eye display device, the waveguide comprising a holographic grating comprising a plurality of angularly multiplexed holograms, each hologram of the plurality of angularly multiplexed holograms having an angular bandwidth that is narrower than a range of angles of light from the image source to provide a field of view narrower than the range of angles of light from the image source, each hologram of the plurality of angularly multiplexed holograms being configured to diffract an image from the image source,
the plurality of angularly multiplexed holograms configured to simultaneously diffract light received from the image source to produce angularly separated diffraction peaks from the light received from the image source, such that
the plurality of angularly multiplexed holograms has a combined angular bandwidth greater than the angular bandwidth of each individual hologram of the plurality of angularly multiplexed holograms to provide a combined field of view with a wider angular width than the field of view of each hologram of the plurality of angularly multiplexed holograms individually; and
a controller configured to control display of an image via the image source.

2. The near-eye display device of claim 1, wherein the waveguide further comprises one or more additional holographic gratings, each additional holographic grating comprising a plurality of angularly multiplexed holograms.

3. The near-eye display device of claim 1, wherein the image source comprises a plurality of laser light emitting diodes.

4. The near-eye display device of claim 1, wherein the plurality of angularly multiplexed holograms includes a first hologram and a second hologram, the first hologram being angularly separated from the second hologram such that an angular bandwidth of the first hologram does not overlap with an angular bandwidth of the second hologram.

5. The near-eye display device of claim 1, wherein each holographic grating includes three or more angularly multiplexed holograms.

6. The near-eye display device of claim 1, wherein a field of view of the near-eye display device is 20 degrees or greater.

7. The near-eye display device of claim 1, wherein the waveguide includes a multiplexed holographic grating for each color of light from the image source.

8. A near-eye display device, comprising:
an image source;
a waveguide configured to propagate light from the image source to a field of view of the near-eye display device, the waveguide comprising:
a holographic input grating comprising a first plurality of angularly multiplexed and spatially overlapping holograms, each hologram of the first plurality of angularly multiplexed and spatially overlapping holograms being configured to diffract an image from the image source and having an angular bandwidth that is narrower than a range of angles of light from the image source to provide a field of view with a narrower angular width than the range of angles from the image source, the first plurality of angularly multiplexed and spatially overlapping holograms being configured to simultaneously diffract light received from the image source to produce angularly separated diffraction peaks from the light received from the image source, such that the first plurality of angularly multiplexed and spatially overlapping holograms has a combined angular bandwidth greater than the angular bandwidth of each individual hologram of the plurality of angularly multiplexed and spatially overlapping holograms to provide a combined field of view with a wider angular width than the field of view provided by each hologram individually, and a holographic output grating comprising a second plurality of angularly multiplexed and spatially overlapping holograms; and a controller configured to control display of an image via the image source.

9. The near-eye display device of claim 8, wherein the waveguide further comprises a holographic fold grating comprising a third plurality of angularly multiplexed and spatially overlapping holograms.

10. The near-eye display device of claim 8, wherein the image source is a visible light array.

11. The near-eye display device of claim 8, wherein the first plurality of angularly multiplexed and spatially overlapping holograms includes a first hologram and a second hologram, the first hologram being angularly separated from the second hologram such that at least a portion of an angular bandwidth of the first hologram does not overlap with an angular bandwidth of the second hologram.

12. The near-eye display device of claim 8, wherein a field of view of the near-eye display device is 20 degrees or greater.

13. The near-eye display device of claim 8, wherein each of the holographic input grating and the holographic output grating includes three or more angularly multiplexed and spatially overlapping holographic recordings.

* * * * *